(12) United States Patent
Dufour et al.

(10) Patent No.: US 9,384,907 B2
(45) Date of Patent: Jul. 5, 2016

(54) CURRENT-CONDUCTING ELECTRODE AND CORRESPONDING MANUFACTURING PROCESS

(75) Inventors: Bruno Dufour, Champagne sur Seine (FR); David Ayme-Perrot, Huningue (FR); Marie Dieudonne, Laguiole (FR); Philippe Sonntag, Hericy (FR)

(73) Assignee: Hutchinson, Paris (FR)

( * ) Notice: Subject to any disclaimer, the term of this patent is extended or adjusted under 35 U.S.C. 154(b) by 194 days.

(21) Appl. No.: 14/130,159

(22) PCT Filed: Jul. 2, 2012

(86) PCT No.: PCT/EP2012/062848
§ 371 (c)(1),
(2), (4) Date: Feb. 4, 2014

(87) PCT Pub. No.: WO2013/004666
PCT Pub. Date: Jan. 10, 2013

(65) Prior Publication Data
US 2014/0153158 A1    Jun. 5, 2014

(30) Foreign Application Priority Data
Jul. 1, 2011  (FR) ..................... 11 02075

(51) Int. Cl.
*H01G 11/28*    (2013.01)
*H01G 11/68*    (2013.01)
(Continued)

(52) U.S. Cl.
CPC .............. *H01G 11/68* (2013.01); *H01G 11/28* (2013.01); *H01G 11/58* (2013.01); *H01G 11/70* (2013.01);
(Continued)

(58) Field of Classification Search
CPC ....... H01G 9/155; H01G 11/70; H01G 11/26; H01G 11/38; H01G 11/58; H01G 11/86; H01G 11/48; H01G 11/24; H01G 11/34; H01G 9/145
See application file for complete search history.

(56) References Cited

U.S. PATENT DOCUMENTS 6,261,722 B1    7/2001  Dasgupta et al.
2002/0196597 A1*  12/2002  Volfkovich .............. H01G 9/02
                                                361/302

(Continued)

FOREIGN PATENT DOCUMENTS

EP    0 867 902 A2    9/1998
EP    0 948 005 A1    10/1999
(Continued)

OTHER PUBLICATIONS

International Search Report of the ISA for PCT/EP2012/062848 dated Nov. 20, 2012.
(Continued)

*Primary Examiner* — Dion R Ferguson
(74) *Attorney, Agent, or Firm* — Daly, Crowley, Mofford & Durkee, LLP

(57) ABSTRACT

The present invention relates in particular to a conductive electrode for an electrical energy storage system (1) having an aqueous electrolyte solution, said electrode comprising a metallic current collector (3) and an active material (7), said metallic current collector (3) comprising a protective conductive layer (5) placed between said metallic current collector (3) and said active material (7), characterized in that said protective conductive layer (5) comprises: —between 30% and 85% as a proportion by weight of dry matter of a copolymer matrix, —between 70% and 15% as a proportion by weight of dry matter of conductive fillers, in addition to the proportion by weight of dry matter of copolymer in order to achieve a total of 100%.

14 Claims, 2 Drawing Sheets

(51) Int. Cl.
*H01M 4/02* (2006.01)
*H01G 11/58* (2013.01)
*H01G 11/70* (2013.01)
*H01G 11/84* (2013.01)
*H01G 9/00* (2006.01)
*H01G 9/145* (2006.01)

(52) U.S. Cl.
CPC ............... *H01G 11/84* (2013.01); *H01M 4/02* (2013.01); *H01G 9/145* (2013.01); *H01G 9/155* (2013.01); *Y02E 60/13* (2013.01)

(56) References Cited

U.S. PATENT DOCUMENTS

| | | | |
|---|---|---|---|
| 2006/0292384 | A1 | 12/2006 | Kazaryan et al. |
| 2008/0237547 | A1 | 10/2008 | Yasuda |
| 2009/0092747 | A1 | 4/2009 | Zhamu et al. |
| 2010/0255323 | A1 | 10/2010 | Nakamura et al. |
| 2011/0052926 | A1 | 3/2011 | Nakamura et al. |
| 2012/0138913 | A1 | 6/2012 | Alsayed et al. |

FOREIGN PATENT DOCUMENTS

| | | | |
|---|---|---|---|
| EP | 2 461 649 | A1 | 6/2012 |
| WO | WO 01/06306 | A2 | 1/2001 |
| WO | WO 2008/103681 | A1 | 8/2008 |
| WO | WO 2010/112680 | A1 | 10/2010 |
| WO | WO 2010/130986 | A1 | 11/2010 |
| WO | WO 2011/077804 | A1 | 6/2011 |
| WO | WO 2012/124647 | A1 | 9/2012 |
| WO | WO 2013004667 | A1 | 1/2013 |
| WO | WO 2014/053572 | A2 | 4/2014 |
| WO | WO 2014/053572 | A3 | 4/2014 |
| WO | WO 2014053574 | A2 | 4/2014 |

OTHER PUBLICATIONS

English Translation of Written Opinion for PCT/EP2013/070593 dated May 26, 2014; 10 pages.
Preliminary Amendment filed on Apr. 2, 2015 for U.S. Appl. No. 14/433,313; 8 pages.
English Translation of Written Opinion for PCT/EP2013/070591 dated May 26, 2014; 10 pages.
Preliminary Amendment filed on Apr. 2, 2015 for U.S. Appl. No. 14/433,314; 7 pages.
English Translation of Written Opinion for PCT/EP2012/062853 dated Aug. 28, 2012; 6 pages.
Preliminary Amendment dated Dec. 30, 2013 for U.S. Appl. No. 14/130,156; 7 pages.
English Translation of Written Opinion for PCT/EP2012/062848 dated Nov. 20, 2012; 12 pages.
International Search Report of the ISA for PCT/EP2012/062853 dated Aug. 28, 2012.
International Search Report of the ISA for PCT/EP2013/070593 dated May 26, 2014.
International Search Report of the ISA for PCT/EP2013/070591 dated May 26, 2014.
English Translation of U.S. Appl. No. 14/130,156, filed May 14, 2014.
English Translation of U.S. Appl. No. 14/433,313, filed Apr. 2, 2015.
English Translation of U.S. Appl. No. 14/433,314, filed Apr. 2, 2015.

* cited by examiner

CURRENT-CONDUCTING ELECTRODE AND CORRESPONDING MANUFACTURING PROCESS

CROSS REFERENCE TO RELATED APPLICATIONS

This application is a U.S. National Stage of PCT application PCT/EP2012/062848 filed in the French language on Jul. 2, 2012, and entitled "CURRENT-CONDUCTING ELECTRODE AND CORRESPONDING MANUFACTURING PROCESS,"which claims priority to French application FR1102075 filed on Jul. 1, 2011.

The present invention relates to conductive electrodes with current collectors, in particular used in energy storage systems such as supercapacitors. More specifically, the present invention relates to a conductive electrode comprising a current collector comprising at least one protective conductive layer and also to the process for producing said, current collector.

Supercapacitors are electrical energy storage systems that are particularly advantageous for applications that necessitate conveying electrical energy at high power. The possibilities of rapid charging and discharging and the increased service life compared to a high-power battery make supercapacitors promising candidates for many applications.

Supercapacitors generally consist of the combination of two conductive electrodes having a high specific surface area, immersed in an ionic electrolyte and separated by an insulating membrane referred to as a "separator", which allows ionic conductivity and prevents electrical contact between electrodes. Bach electrode is in contact with a metallic current collector enabling the exchange of the electric current with an outside system. Under the influence of a potential difference applied between the two electrodes, the ions present within, an electrolyte are attracted by the surface having an opposite charge thus forming an electrochemical double layer at the interface of each electrode. The electrical energy is thus stored electrostatically by charge separation.

The expression of the capacitance of such supercapacitors is identical to that of conventional electrical capacitors, namely:

$$C = \epsilon . S/e$$

with: $\epsilon$: the permittivity of the medium,

S: the surface area occupied by the double layer, and e: the thickness of the double layer.

The capacitances that can be attained within supercapacitors are much larger than those commonly attained by conventional capacitors, due to the use of porous electrodes having a high specific surface area (maximization of the surface area) and due to the extreme thinness of the electrochemical double layer (a few nanometres).

The carbon-based electrodes used within supercapacitive systems must inevitably be:

conductive, in order to ensure the transport of the electrical charges, porous, in order to ensure the transport of the ionic charges and the formation of the electrical double layer over a large surface area, and chemically inert, to prevent any energy-consuming parasitic reactions.

The energy stored within the supercapacitor is defined according to the conventional expression of capacitors, namely:

$$E = \frac{1}{2} . C . V^2,$$

in which V is the electric potential of the supercapacitor.

According to this expression, the capacitance and the potential are two essential parameters that it is necessary to optimize in order to favour the energy performances. For example, for applications in transport and especially for an electric vehicle, having a high energy density is necessary in order to limit the onboard mass of supercapacitors.

The potential depends mainly on the nature of the electrolyte. Typically, various types of electrolyte exist. One family is the family of organic electrolytes, that is to say those comprising an organic salt dispersed in an organic solvent. Some of these electrolytes snake it possible to attain an operating potential of 2.7 V. On the other hand, these electrolytes are expensive, inflammable, toxic and potentially polluting. They thus pose safety problems for use in a vehicle. Aqueous electrolytes are inexpensive and nonflammable, they are therefore more advantageous for this application. In an aqueous medium, the applicable potential is 1.2 V. Various aqueous electrolytes may be used, for example an aqueous solution of sulphuric acid, or of potassium chloride, or of potassium sulphate, or of other salts in an acidic, basic or neutral medium.

In order to store a high energy density, it is therefore necessary to have a high capacitance per unit weight. The capacitance depends on the porous texture actually accessible by the electrolyte, the potential depends itself directly on the stability of the electrolyte under the influence of the electric field.

In order to obtain a high capacitance per unit weight, one known solution is to add active material to the supercapacitors. Various possibilities exist for incorporating the active material into a supercapacitor. Document PCT/FR2009/000332 describes the use of monolithic carbons in supercapacitors having high capacitances per unit weight. In order to attain high energy densities, it is therefore particularly advantageous to incorporate the active material into the system in monolith form. Specifically, in this case, no inert binder is necessary for dispersing the active material; which makes it possible, ipso facto, to increase the energy density that can be attained.

In order to be able to achieve operation with high powers, the resistance to the passage of the current in the system (ESR) must be very low. Specifically, this resistance leads to losses via the Joule effects which reduce the efficiency of the supercapacitor. This resistance is the sum of the resistances of the various components of the system, and especially the resistance of the electrolyte, and the resistance of the current collectors. In the case of an active material in monolith form, a primary contribution is the resistance of the interface between the current collector and the active material. This resistance is dependent on the quality and on the nature of the contact.

In order to limit the contribution of the resistances of the current collectors, it is necessary to use metals of high conductivities. Furthermore, in the interest of economy and ease of use, the metals used must be inexpensive and must be able to be easily formed. Examples of metals that may be favourably used are therefore typically copper and aluminium. The use of these materials in an aqueous medium however poses chemical and electrochemical stability problems. Indeed, at a typical oxidation potential in an aqueous medium of 1.2 V, most of the metals corrode.

It is therefore necessary both to protect the metallic collector from corrosion and to have a good electrical contact between the collector and the monolithic active material.

For this, various strategies have been used. Document EP 1 032064 describes a current collector of a positive electrode constituted of a paste of active material comprising a polymer layer comprising an oxalate and a compound based on silicon, on phosphate or on chromium. This solution makes it possible to protect the collector during the deposition of the paste of active material font has no effect on the characteristics of the electrode in use. Furthermore, this strategy cannot be used in the case of a monolith as active material. It is therefore necessary to use an interface between the metallic current collector and the monolithic active material.

Using an interface of lower conductivity than the metal of the collector between the latter and the active material poses a problem, since it is highly likely to increase the resistance of the system and therefore to disrupt the functioning with high electric powers. Various interfaces have been tested between the collector and the active material.

One solution consists in coating the collector with a protective layer. Document FR 2824418 describes a current collector covered with a layer of paint comprising conductive particles, such as graphite or carbon black. The paint is applied between the collector and the active material, then is heated in order to remove the solvent. The paint is an epoxy-based paint or a polyurethane-based paint. This layer of paint makes it possible to protect the collector in an organic medium, but no information is given on its effectiveness for protecting the collector from an aqueous electrolyte. Furthermore, these paints are cross linked, and are therefore not very deformable and can not thus conform to the surface of the active material when it is present in monolith form, which increases the contact resistance and therefore prevents optimal functioning of the supercapacitor, Document WO 2007/036641 describes a method for depositing a thin film of carbon by deposition of a dispersion of carbon-based particles in a sol-gel polymer followed by the removal of said sol-gel polymer at a high temperature. This additional layer makes it possible to improve the conduction properties at the contact. Nevertheless, no information is given on its impermeability in an aqueous medium. Furthermore, the carbon-based films obtained by this method are brittle and are subject to abrasion during the assembling of the electrodes.

One of the objectives of the invention is therefore to propose a current collector and also the production process thereof, having optimized conductivity and longevity properties, especially in the use thereof within an electrode containing monolithic active material.

Thus, the present invention relates to a conductive electrode for an electrical energy storage system containing an aqueous electrolytic solution, said electrode comprising a metallic current collector and an active material, said metallic current collector comprising a protective conductive layer placed between said current collector and said active material, said protective conductive layer comprising:
  between 30% and 85% in a proportion by weight of dry matter of a copolymer matrix,
  between 70% and 15% in a proportion by weight of dry matter of conductive fillers, in addition to the proportion by weight of dry matter of copolymer in order to achieve a total of 100%.

According to one aspect of the invention, the metallic current collector comprises at least one additional protective conductive layer placed on the protective conductive layer.

According to another aspect of the invention, the protective conductive layer comprises:
  between 50% and 65% in a proportion by weight of dry matter of a copolymer matrix,
  between 50% and 35% in a proportion by weight of dry matter of conductive fillers, in addition to the proportion by weight of dry matter of copolymer in order to achieve a total of 100%.

According to another aspect of the invention, the copolymer comprises vinyl chloride units and/or vinyl acetate units and/or carboxylic acid groups.

According to another aspect of the invention, the copolymer matrix additionally comprises additives.

According to another aspect of the invention, the conductive fillers are chosen from carbon black and/or graphite and/or carbon nanotubes.

According to another aspect of the invention, the thickness of the protective conductive layer is between 5 and 50 micrometres.

According to another aspect of the invention, the active material is a monolithic active material.

According to another aspect of the invention, the monolithic active material is a carbon monolith.

The present invention also relates to a process for producing a metallic current collector for an electrical energy storage system, said metallic current collector being intended to come into electrical contact with an active material so as to form a conductive electrode containing an aqueous electrolytic solution, and comprising a protective conductive layer, comprising the following steps:
  preparation, of a composition comprising 30% to 85% of a copolymer in a proportion by weight of dry matter and 70% to 15% of conductive fillers in a proportion by weight of dry matter, in addition to the proportion by weight of dry matter of copolymer in order to achieve a total of 100%, diluted in a solvent in order to achieve a viscosity of 1000 mPa to 10 000 mPa at 50 rpm,
  deposition of said composition on the current collector,
  first heat treatment of the covered metallic current collector at a temperature below the boiling point of the solvent,
  second heat treatment of the covered metallic current collector at a temperature above the glass transition temperature of the copolymer and above the boiling point of the solvent, said heat treatment temperature being however below the degradation temperature of the polymer.

According to another aspect of the production process, said, process further comprises, following the second heat treatment step, the following steps for applying at least one additional protective conductive layer;
  deposition of a composition comprising 30% to 85% of a copolymer in a proportion by weight of dry matter and 70% to 15% of conductive fillers in a proportion by weight of dry matter, in addition to the proportion by weight of dry matter of copolymer in order to achieve a total of 100%, diluted in a solvent in order to achieve a viscosity of 1000 mPa to 10 000 mPa at 50 rpm,
  heat treatment at a temperature below the boiling point of the solvent,
  subsequent heat treatment at a temperature above the glass transition temperature of the copolymer and above the boiling point of the solvent, said, heat treatment temperature being however below the degradation temperature of the polymer.

According to another aspect of the production process, the final viscosity of the composition is 7200 mPa at 50 rpm.

According to another aspect of the production process, the composition comprises 50% to 65% of copolymer in a proportion by weight of dry matter, 50% to 35% of conductive fillers in a proportion by weight of dry matter, in addition to the proportion by weight of dry matter of copolymer in order to achieve a total of 100%.

According to another aspect of the production process, the copolymer comprises vinyl chloride units and/or vinyl acetate units and/or carboxylic acid groups.

According to another aspect of the production process, the composition comprising 30% to 85% of a copolymer in a proportion by weight of dry matter and 70% to 15% of conductive fillers in a proportion by weight of dry matter, additionally comprises additives.

According to another aspect of the production process, the conductive fillers are chosen from carbon black and/or graphite and/or carbon nanotubes.

According to another aspect of the production process, the step of depositing the composition on the metallic current collector is carried out using a film spreader.

According to another aspect of the production process, the first and second heat treatment steps have a duration of 30 minutes each.

Other features and advantages of the invention will become more clearly apparent on reading the following description, given by way of illustrative and nonlimiting example, and from the appended drawings, among which:

FIG. 1 shows a schematic representation of the structure of a supercapacitor 1.

Figure 1:
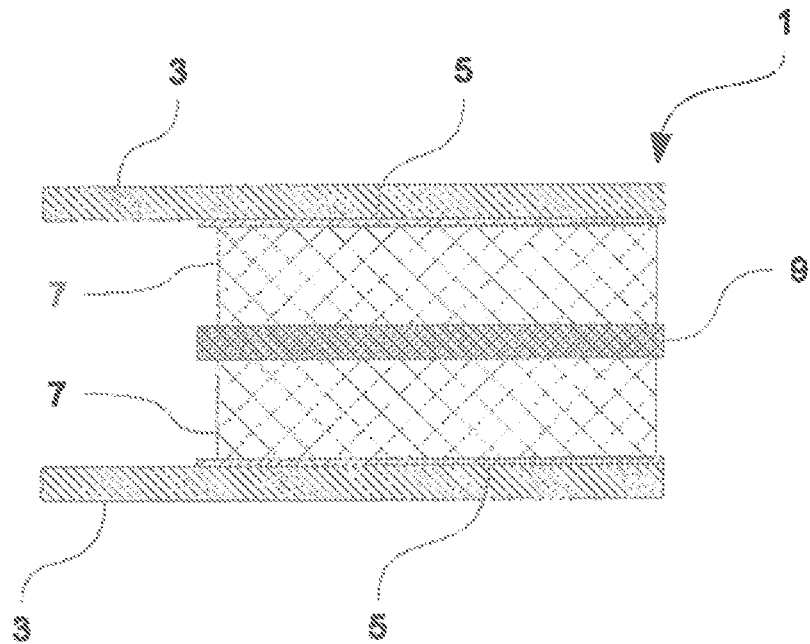
FIG. 1 shows a schematic representation of the structure of a supercapacitor.

The supercapacitor 1 comprises two conductive electrodes immersed in an ionic electrolyte (not represented) and separated by an insulating membrane referred to as a separator 9, which permits ionic conductivity and prevents electrical contact between the electrodes.

Each electrode comprises a metallic current collector 3, for example made of copper or aluminium, covered with a protective conductive layer 5, for example having a thickness between 5 and 50 micrometres, and also a monolithic active material 7, for example made of carbon, in contact with the separator 9.

The protective layer 5 is impermeable to the aqueous electrolytes especially in an acid medium, for example at a pH of less than or equal to 4, or else in a neutral medium at a pH of 7. This impermeability thus allows protection of the metallic current collector 3 against corrosion in aqueous media, thus preventing a deterioration of the electrical contact between said metallic current collector 3 and the monolithic active material 7.

Furthermore, the protective conductive layer 5 also allows an improvement of the electrical contact between said metallic current collector 3 and the monolithic active material 7.

The protective conductive layer 5 preferably comprises between 30% and 85% in a proportion by weight of dry matter of a copolymer matrix and between 70% and 15% in a proportion by weight of dry matter of conductive fillers, in addition to the proportion by weight of dry matter of copolymer in order to attain a total of 100%.

Using a copolymer enhances the flexibility of the one protective conductive layer 5, which is favourable for the purpose of reducing the contact resistance.

Moreover, a copolymer adheres more easily to a metallic surface, removing the need to use additives which might migrate into the electrolyte during the use of the electrode, and might disrupt its operation.

The copolymer used preferably comprises vinyl chloride units and/or vinyl acetate units and/or carboxylic acid groups, such as for example Vinnol H15/45 M.

The copolymer matrix may additionally comprise additives such as crosslinking agents, wetting agents, dispersants or else stabilizers.

As for the conductive fillers, they are preferably chosen from carbon black and/or graphite and/or carbon nanotubes.

According to one alternative embodiment, the metallic current collector 3 may comprise at least one additional protective conductive layer (not shown) placed on the protective conductive layer 5. The at least one additional protective conductive layer may be similar to the protective conductive layer 5 and may therefore have features similar to that layer. The addition of at least one additional protective conductive layer on the protective layer 5 thus allows the protection of the metallic current collector 3 to be enhanced.

The process for producing the metallic current collector 3 covered with the protective conductive layer 5 is carried out in several steps.

The first step is a step of preparing a composition comprising 30% to 85% of a copolymer in a proportion by weight of dry matter and in addition 70% to 15% of conductive fillers in a proportion by weight of dry matter, in addition to the proportion by weight of dry matter of copolymer in order to attain a total of 100%.

As stated previously, the copolymer used preferably comprises vinyl chloride units and/or vinyl acetate units and/or carboxylic acid, groups, such as for example Vinnol H15/45 M.

As for the conductive fillers, they are preferably chosen from carbon block and/or graphite and/or carbon nanotubes.

This composition is diluted in a solvent, for example methyl isobutyl ketone (MIBK), in order to attain a viscosity value between 1000 mPa and 10 000 mPa, measured with a Brookfield viscometer.

This composition may additionally comprise additives such as crosslinking agents, wetting agents, dispersants or else stabilizers.

The second step is a step of applying a layer of the composition on the metallic current collector 3, for example by means of a film spreader.

The third step is a step of heat treatment of the covered metallic current collector 3, at a temperature that is below the boiling point of the solvent but that is sufficient in order to have evaporation and therefore a removal of a large part of the solvent from the composition.

This heat treatment step thus makes it possible to remove the solvent from the protective conductive layer 5 covering the metallic current collector 3, while retaining the mechanical properties of the latter.

The fourth step is again a step of heat treatment of the covered metallic current collector 3. This new heat treatment takes place at a temperature above the glass transition temperature (tg) of the copolymer and above the boiling point of the solvent, said heat treatment temperature being however below the degradation temperature of the copolymer.

The expression "degradation temperature" is understood to mean the temperature at which the copolymer is destroyed and disappears from the protective conductive layer 5.

The glass transition temperature (tg) of the copolymer may for example be 75° C. for Vinnol H15/45 M as measured by differential scanning calorimetry (DSC) with a reascendance rate of 10° C. per minute.

This second heat treatment makes it possible to remove the excess solvent and also to strengthen the impermeability of the protective conductive layer 5.

The duration, of each heat treatment of the third and fourth steps may, for example, be 30 minutes in order to foe optimal.

In the alternative embodiment where the metallic current collector 3 comprises at least one additional protective conductive layer, the production process further comprises additional steps for applying said additional protective conductive layer. These steps are carried out following the second heat treatment step, and are as follows:

- deposition of a composition comprising 30% to 85% of a copolymer in a proportion by weight of dry matter and 70% to 15% of conductive fillers in a proportion by weight of dry matter, in addition to the proportion by weight of dry matter of copolymer in order to achieve a total of 100%, diluted in a solvent in order to achieve a viscosity of 1000 mPa to 10 000 mPa at 50 rpm, for example by means of a film spreader,
- heat, treatment at a temperature below the boiling point of the solvent,
- subsequent, heat treatment at a temperature above the glass transition temperature of the copolymer and above the boiling point of the solvent, said heat, treatment temperature being however below the degradation temperature of the polymer.

These steps of applying additional protective conductive layer may be repeated successively so as to obtain the desired number of additional protective conductive layers. In the same way as the heat treatments of the protective conductive layer (5), the heat treatments may last 30 minutes, for example, for optimum results.

Illustrated below in Table 1 are examples of compositions having a final viscosity of 7200 mPa at 50 rpm, used for producing a metallic current collector 3 covered with a protective conductive layer 5 according to the invention.

The compositions used in these examples all comprise between 50% and 65% in a proportion by weight of dry matter of a copolymer matrix and in addition between 50% and 35% in a proportion by weight of dry matter of conductive fillers, in addition to the proportion by weight of dry matter of copolymer in order to attain a total of 100%.

TABLE 1

Composition formulation examples

| Formulation | | Example 1 | Example 2 | Example 3 | Example 4 | Example 5 |
|---|---|---|---|---|---|---|
| Copolymer | Vinnol H 15/45M 20% in MIBK | 100 g | 100 g | 100 g | 100 g | 100 g |
| Conductive fillers | ENSACO 260G | 0 | 8 g | 12 g | 0 | 8 g |
| | ENSACO 250P | 8 g | 0 | 0 | 0 | 0 |
| | ENSACO 350G | 0 | 0 | 0 | 8 g | 0 |
| | Nanocyl 3101 | 0 | 0 | 0 | 0 | 0.5 g |
| | Graphite | 4 g | 4 g | 6 g | 4 g | 2 g |

1) Characterization of the Electrical Resistance of Covered Metallic Current Collectors 3 and of the Conductivity of a Protective Conductive Layer 5 Obtained with one of the Compositions of Examples 1 to 5.

Figure 2:
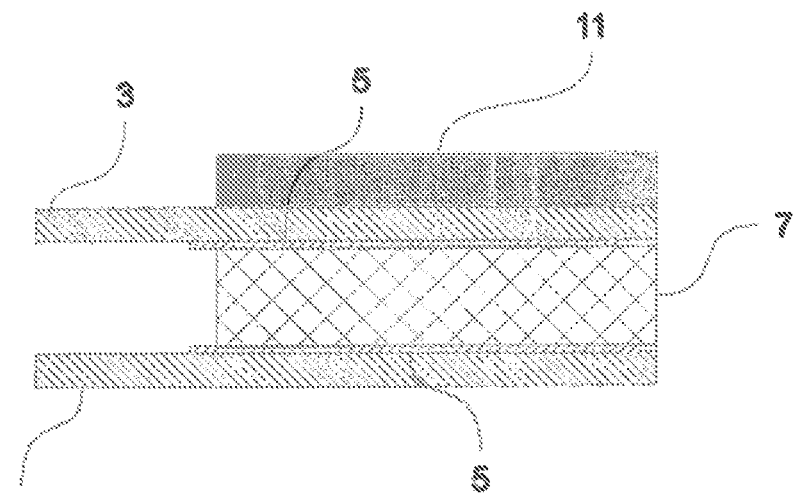
FIG. 2 shows a schematic representation of a test structure made for measuring the contact resistances.

First, a measurement of the electrical resistance is carried out on a test structure illustrated by FIG. 2.

Initially, a layer 5 having a thickness of 100 microns of these compositions is deposited on a copper current collector 3 using a film spreader that enables a homogeneous and controlled deposition.

After drying for 30 minutes at 50° C., the covered copper current collector 3 is then treated at 120° C. for 30 minutes.

The thickness of the protective conductive layer 5 is measured using a micrometer, and is between 20 and 30 micrometres for each face.

The test structure illustrated by FIG. 2 then comprises a monolithic carbon 3 having a surface area of 2.5×2.5 cm and a thickness of 0.7 mm placed between two covered copper current collectors 3, and put under pressure by a weight 11, for example 200 N, which makes it possible to characterize the electrical contacts. The measured resistance must be as low as possible to allow a high-power operation of the supercapacitor.

The resistance linked to the copper circuit was measured at 8 mΩ, and was substrated from the values measured.

Subsequently, a protective conductive layer 5 is deposited on glass according to the same method used previously, in order to measure the conductivity of said protective conductive layer 5. This measurement is carried out by a conventional four-point conductivity test.

The measured characteristics of the electrical resistance of metallic current collectors covered with a protective conductive layer 5 obtained with one of the compositions from Examples 1 to 5 and also of the conductivity are listed in Table 2.

2) Characterization of the Impermeability of a Protective Conductive Layer 5 Obtained with one of the Compositions from Examples 1 to 5, Covering a Metallic Current Collector 3.

The impermeability of the protective conductive layer 5 is characterized by electrochemical impedance spectroscopy (EIS) of model cells operating under a voltage of 1 V, before and after 1000 galvanostatic cycles at 0.125 A/g.

These model cells, identical to the structure of a supercapacitor 1 represented by FIG. 1, are obtained by assembling two monolithic carbons 7 having a thickness of 0.7 mm to two coated copper current collectors 3 between which a separator 5 is placed. The assembly is filled with electrolyte diluted in water and packaged between two plastic films. A first series of tests is carried out in an acid medium with a 1M sulphuric acid ($H_2SO_4$) electrolyte and a second series of tests is carried out in a neutral medium with a 5M sodium perchlorate ($NaClO_4$) electrolyte.

EIS makes it possible to demonstrate the existence of parasitic faradic phenomena. These reactions take place when the copper is exposed to the electrolyte. In this case, during the cycling, the metal is degraded and the device can no longer function.

Figure 3:
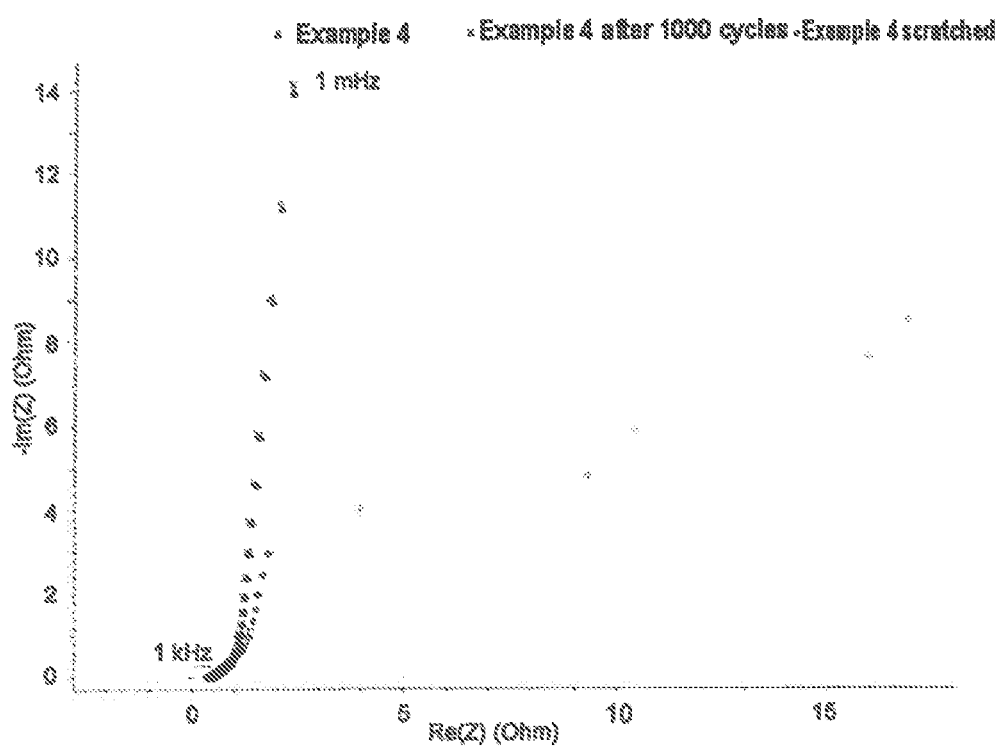
FIG. 3 shows a graph of the results of electrochemical impedance spectroscopy measurements of an example according to the invention.

An EIS of a copper coated with a protective conductive layer 5 obtained with the composition from Example 4 is represented, in FIG. 3 before and after cycling. In these cases, the behaviour observed is purely capacitive, the impermeability test is therefore considered to be successful.

The protective conductive layer 5 obtained with the composition from Example 4 from Example 4 was then scratched using a scalpel blade in order to reveal the copper. In this case, the behaviour observed demonstrates faradic phenomena, linked to the oxidation of the copper, the impermeability test is considered as having failed.

The impermeability characteristics of coppers covered with a protective conductive layer 5 obtained with one of the compositions from Examples 1 to 5 are also listed in Table 2.

3) Results

TABLE 2

Experimental results

| Formulation | Ex 1 | Ex 2 | Ex 3 | Ex 4 | Ex 5 | No coating |
|---|---|---|---|---|---|---|
| Electron conductivity of the protective conductive layer (S/cm) | 1 | 2 | 5 | 0.4 | 9 | $10^7$ |
| Resistance at 200N according to FIG. 2 (mΩ) | 60 | 71 | 38 | 93 | Measurement too low | >200 |
| Impermeability test (EIS) with 1M $H_2SO_4$ | + | + | + | + | + | − |
| Impermeability test after 1000 cycles (EIS) with 1M $H_2SO_4$ | + | + | + | + | + | − |
| Impermeability test (EIS) with 5M $NaClO_4$ | + | + | + | + | + | − |
| Impermeability test after 1000 cycles (EIS) with 5M $NaClO_4$ | + | + | + | + | + | − |

Legend:
+: EIS impermeability test successful,
−: EIS impermeability test failed Thus, as shown in experimental results Table 2, the protective conductive layer 5 described in Examples 1 to 5 makes it possible not only to protect the metallic collector from the degradation linked to oxidation in the presence of electrolyte, but also, surprisingly, to improve the electrical contact between the collector and the monolithic active material compared to a collector without a coating.

The invention claimed is:

1. A conductive electrode for an electrical energy storage system containing an aqueous electrolytic solution, said electrode comprising a metallic current collector and an active material, said current collector comprising a protective conductive layer placed between said metallic current collector and said active material, characterized in that said protective conductive layer consists essentially of:
   between 30% and 85% in a proportion by weight of dry matter of a copolymer matrix, said copolymer comprising vinyl chloride units and/or vinyl acetate units and/or carboxylic acid groups; and
   between 70% and 15% in a proportion by weight of dry matter of conductive fillers, in addition to the proportion by weight of dry matter of copolymer in order to achieve 100% of a total weight of said protective conductive layer.

2. The conductive electrode as claimed in claim 1, characterized in that the metallic current collector comprises at least one additional protective conductive layer placed on the protective conductive layer.

3. The conductive electrode as claimed in claim 1, characterized in that the protective conductive layer consists essentially of:
   between 50% and 65% in a proportion by weight of dry matter of copolymer matrix; and
   between 50% and 35% in a proportion by weight of dry matter of conductive fillers, in addition to the proportion by weight of dry matter of copolymer in order to achieve 100% o f the total weight of said protective conductive layer.

4. The conductive electrode as claimed in claim 1, characterized in that the conductive fillers are chosen from carbon black and/or graphite and/or carbon nanotubes.

5. The conductive electrode as claimed in claim 1, characterized in that the thickness of the protective conductive layer is between 5 and 50 micrometres.

6. The conductive electrode as claimed in claim 1, characterized in that the active material is a monolithic active material.

7. The conductive electrode as claim in claim 1, characterized in that the monolithic active material is a carbon monolith.

8. A process for producing a metallic current collector for an electrical energy storage system, said metallic current collector being intended to come into electrical contact with an active material so as to form a conductive electrode containing an aqueous electrolytic solution, and comprising a protective conductive layer, the process comprising:
   preparation of a composition consisting essentially of 30% to 85% of a copolymer in a proportion by weight of dry matter, said copolymer comprising vinyl chloride units and/or vinyl acetate units and/or carboxylic acid groups; and 70% to 15% of conductive fillers in a proportion by weight of dry matter, in addition to the proportion by weight of dry matter of copolymer in order to achieve 100% of a total weight of said protective conductive layer, diluted in a solvent in order to achieve a viscosity of 1000 mPa to 10000 mPa at 50 rpm,
   deposition of said composition on the metallic current collector,
   first heat treatment of the covered metallic current collector at a temperature below the boiling point of the solvent,
   second heat treatment of the covered metallic current collector at a temperature above the glass transition temperature of the copolymer and above the boiling point of the solvent, said heat treatment temperature being however below the degradation temperature of the polymer.

9. The production process as claimed in claim 8, characterized in that it further comprises, following the second heat treatment, applying at least one additional protective conductive layers:
   deposition of a composition consisting essentially of 30% to 85% of a copolymer in a proportion by weight of dry matter and 70% to 15% of conductive fillers in a proportion by weight of dry matter, in addition to the proportion by weight of dry matter of copolymer in order to achieve 100% of the total weight of said protective conductive layer, diluted in a solvent in order to achieve a viscosity of 1000 mPa to 10000 mPa at 50 rpm;

heat treatment at a temperature below the boiling point of the solvent; and subsequent heat treatment at a temperature above the glass transition temperature of the copolymer and above the boiling point of the solvent, said heat treatment temperature being however below the degradation temperature of the polymer.

10. The production process as claimed in claim 8, characterized in that the final viscosity of the composition is 7200 mPa at 50 rpm.

11. The production process as claimed in claim 8, characterized in that the composition consists essentially of 50% to 65% of copoloymer in a proportion by weight of dry matter, 50% to 35% of conductive fillers in a proportion by weight of dry matter, in addition to the proportion of weight of dry matter of copolymer in order to achieve 100% of the total weight of said protective conductive layer.

12. The production process as claimed in claim 8, characterized in that the conductive fillers are chosen from carbon black and/or graphite and/or carbon nanotubes.

13. The production process as claimed in claim 8, characterized in that depositing the composition on the current collector is carried out using a film spreader.

14. The production process as claimed in claim 8, characterized in that the first and second heat treatment have a duration of 30 minutes each.

* * * * *